Jan. 15, 1935.  H. C. BRUNNER  1,987,665
FLOW CONTROL SYSTEM
Filed Dec. 19, 1930  4 Sheets-Sheet 2

WITNESSES
E. A. McCloskey
P. C. Friedemann

INVENTOR
Harry C. Brunner
BY Wesley G. Carr
ATTORNEY

Jan. 15, 1935.                H. C. BRUNNER                    1,987,665
                            FLOW CONTROL SYSTEM
                          Filed Dec. 19, 1930          4 Sheets-Sheet 3
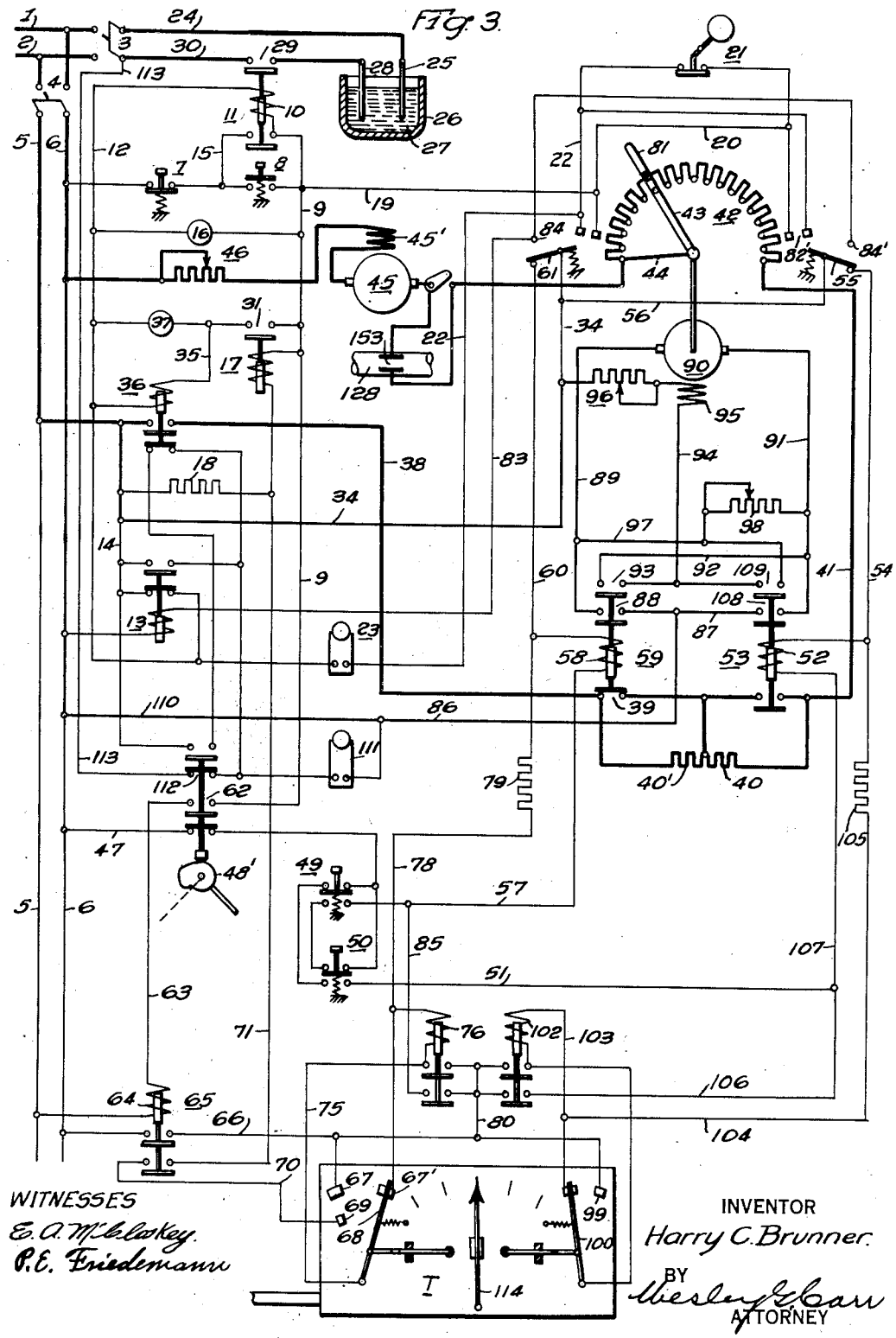
WITNESSES
E. A. McCloskey
P. E. Friedemann
INVENTOR
Harry C. Brunner
BY
Wesley L. Carr
ATTORNEY Jan. 15, 1935. H. C. BRUNNER 1,987,665
FLOW CONTROL SYSTEM
Filed Dec. 19, 1930 4 Sheets-Sheet 4
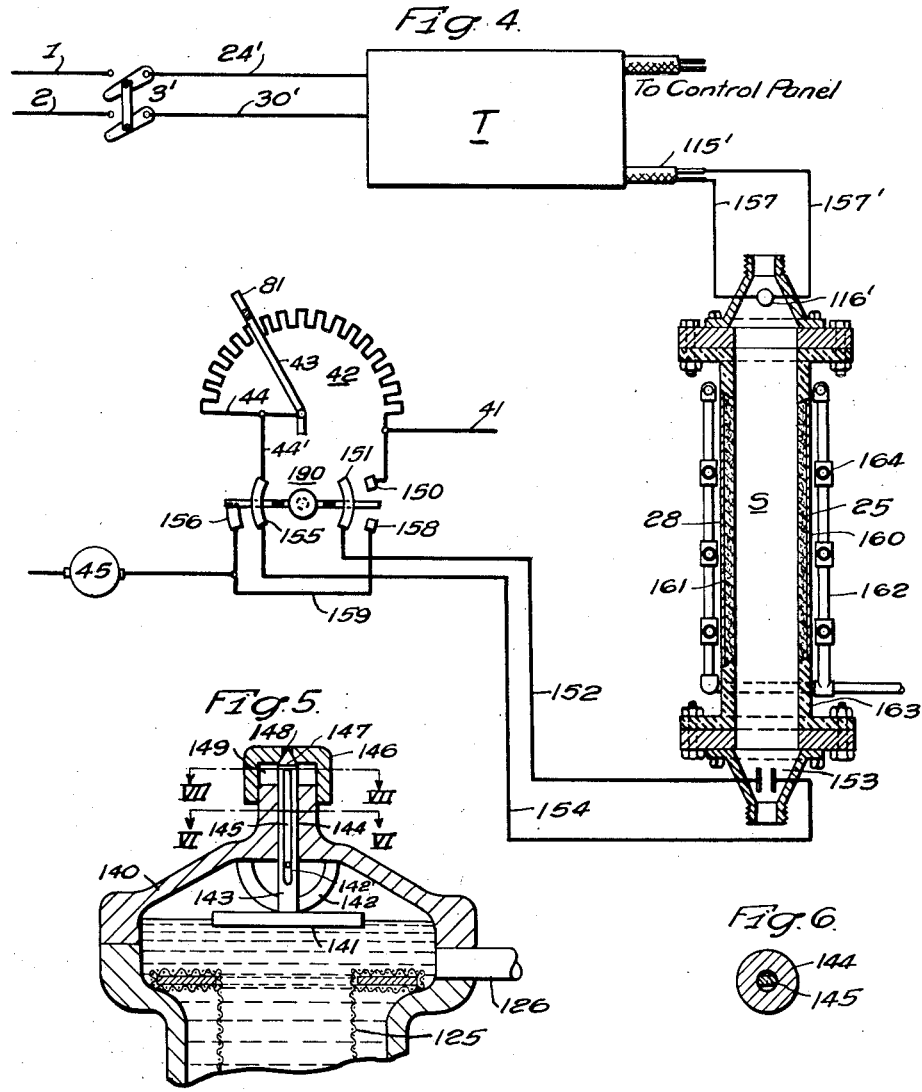
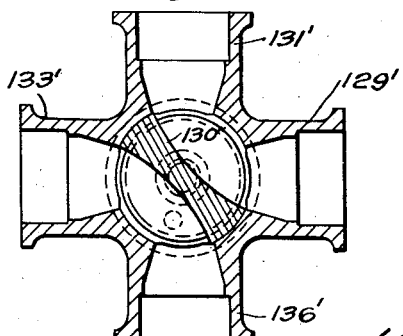
WITNESSES
E. A. M'Closkey
P. E. Friedemann
INVENTOR
Harry C. Brunner.
BY
Wesley G. Carr
ATTORNEY Patented Jan. 15, 1935

1,987,665

UNITED STATES PATENT OFFICE 1,987,665

FLOW CONTROL SYSTEM

Harry C. Brunner, Wilkinsburg, Pa., assignor to Westinghouse Electric & Manufacturing Company, a corporation of Pennsylvania Application December 19, 1930, Serial No. 503,479

17 Claims. (Cl. 219—40)

My invention relates to apparatus for automatically electrically treating liquids or semi-liquid pastes.

One object of my invention is to provide for starting a process for treating liquids in such manner as to prevent "seeding" the flow system with undesirable organisms.

An object of my invention is to provide for automatically electrically treating liquids of all kinds, but particularly milk, wherein any living organisms or bacteria, and more particularly pathogenic microorganisms therein, may be killed or rendered inactive by the effect of an alternating current of electricity, whereby each molecule of the liquid being treated is affected instantaneously and simultaneously.

A further object of the invention is to provide for controlling the starting of the system and in passing a liquid, having a resistance to flow of electric current approximately equal to that of the liquid to be automatically treated, through the system, including a supply tank, the coils of a regenerative heater, the pumping means, the filter and the electro-purifier. By this method of operation of the system for a period of time with a liquid whose electrical resistance is approximately equal to the electrical resistance of the liquid to be treated, the flow system is brought up to the desired temperature and flushed with a properly treated liquid before the milk, or other liquid to be treated, is started into the flow system and, consequently, does not "seed" the flow system with pathogenic microorganisms, and no milk passes from the electro-purifier to the bottling machines except that which has received sufficient electrical treatment.

In apparatus heretofore used in the treating of milk by electric current, for want of an adequate electrical control system and the proper arrangement of conduits, pump and valves, under-treated milk and, at times, un-treated milk may be mixed with the treated milk and thus "seed" the cooling coils and other parts of the flow system. Such milk, if retained in the receptacles into which the succeeding treated milk is deposited, would contaminate the entire body of the milk treated.

It is an object of my invention to so arrange the elements of the flow system and to so automatically electrically control a valve or a plurality of valves in the flow system, that under-treated liquid will recirculate, during automatic operation, until liquid sufficiently treated is discharged from the treating chamber, and under-treated liquid will flow back into the supply tanks when the system is manually controlled or stops operation.

A further object of my invention is the provision of an electrical control system for automatically controlling the speed of flow of the liquid through the flow system in response to predetermined changes in the electrical characteristics of the liquid being treated, and to automatically stop the operation of the system when the electrical characteristics of the liquid being treated deviate a predetermined amount from a given value.

A more particular object of my invention is to provide for electrically treating liquids, such as milk, having component parts of different specific gravity, so that the liquid, particularly milk, may be preserved in an acceptable state after being treated in the manner hereinafter set forth.

Other and more specific objects and the particularly novel features of my invention will become more apparent from a study of the following specification and the claims thereto appended, if taken in conjunction with the accompanying drawings, in which:

Figs. 2 and 3 are schematic showings of two preferred embodiments of the electrical control system for automatically controlling the operation of the flow system shown in Fig. 1;

Fig. 4 is a view, partially in elevation, partially in section and partially diagrammatic, of the treating chamber of an electrical control apparatus that may be used with the flow system shown in Fig. 1;

Fig. 5 is a more detail sectional view of the upper portion of the filter; and,

Figs. 6 and 7 are detail sectional views, taken on section lines VI and VII, respectively, of the valve mechanism mounted in the upper portion of the filter;

Fig. 8 is a sectional view of a four-way valve used at the discharge end of the pasteurizer.

Figure 1:
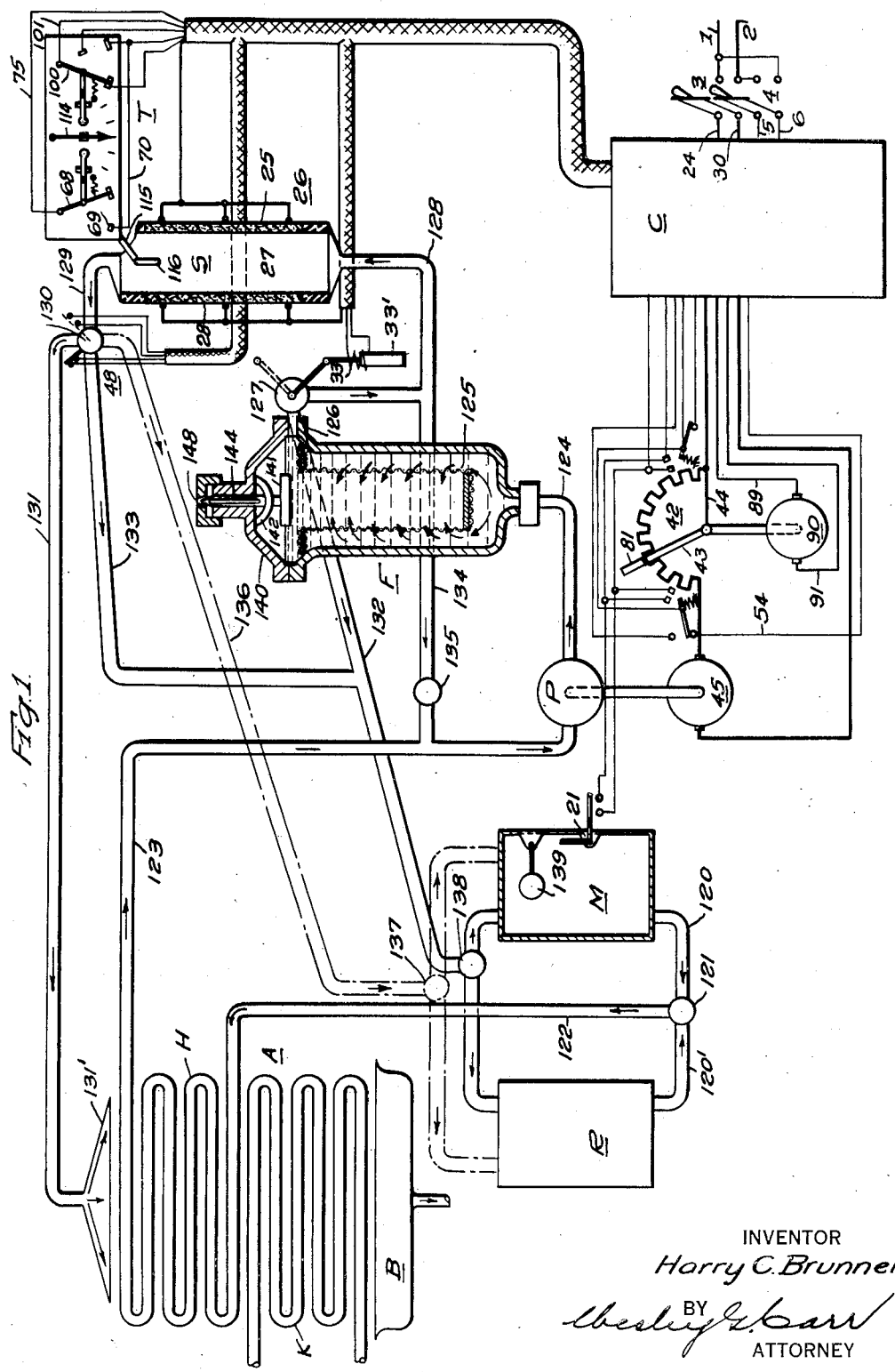
Fig. 1 is an elevation, somewhat diagrammatic, of the flow system, shown in combination with the electrical apparatus including, the pump motor, the motor-operated rheostat, the electrical control means mounted at the upper portion of the treating chamber and the controller.

Referring more particularly to Fig. 1 of the drawings, wherein the flow system for electrically treating liquids is shown in combination with the electrical control system, M designates the supply tank for the liquid to be treated and R designates a supply tank for the recirculating brine having electrical characteristics approximately the same as the electrical characteristics of the liquid to be treated.

A regenerative heater A is associated with the flow system, the heater having the heating coils H and the cooling coils K. The spreader head, for distributing the treated liquid over the heating coils and the cooling coils, is shown at 131'. B designates the receptacle for collecting the treated liquid and conveying it to the bottling machine (not shown). Both the supply tanks M and R are provided with float-controlled valves, diagrammatically shown at 139 in tank M, for maintaining the liquid level in tanks M and R substantially constant, so that the load on the motor 45 driving the pump P will be substantially constant. The supply tank M is supplied, from a suitable reservoir (not shown), with the liquid to be treated.

The particular arrangement of the flow system shown in Fig. 1 is especially designed for the treatment of milk, but it is to be understood that this apparatus and the electrical control system for automatically controlling the apparaus are equally well adapted for the treatment of any other liquid.

The electro-purifier or pasteurizing chamber is shown diagrammatically at S and comprises a chamber, rectangular in horizontal cross-section, provided with a pair of oppositely disposed carbon electrodes constructed as a pair of smooth interior side walls of the chamber. A more detailed showing of the pasteurizer appears in Fig. 4 of the drawings. The carbon electrodes 25 and 28 are insulated from each other by the insulating material 163 and are reinforced by copper backing plates 160 and 161. The copper plates and carbon electrodes are also in very effective heat-transfer relation as the result of a method of construction intimately uniting the copper and the carbon. A more detailed description of these special electrodes than that here given is not necessary, because the specific electrodes per se do not constitute parts of this invention.

A pair of conduits 162, having a plurality of horizontally projecting tubes 164, are disposed adjacent to the copper backing plates. The tubes 164 are provided with a relatively large number of apertures for discharging a cooling liquid, preferably water, against the backing plates of the electrodes. It is, therefore, obvious that, with the proper design of the cooling system, the carbon electrodes may be maintained cool, regardless of the temperature of the liquid in the treating chamber, and no hot surface will be exposed to the liquid being treated. Furthermore, the liquid being treated will not collect on the electrodes to thereby give the liquid a scorched taste.

In order to understand the details of operation of my electrical control system and the flow system, a broad description of the normal operation of the electro-purifier shown in Fig. 1, may not be amiss. During normal operations, in the treatment of milk, the float-controlled valve arrangement, shown graphically at 139 in the supply tank M, maintains the level of the milk substantially constant, so that the load on the pump motor remains substantially constant. The valve 121 is so positioned that the milk from the supply tank M passes through conduits 120, valve 121, conduit 122, the heating coils H of the regenerative heater A, conduit 123, the pump P and conduit 124, to the filter F. It will be noted that the milk passes upwardly through the heating coils H, thereby being more effectively heated by the hot treated milk flowing over the heating coils from the spreader head 131'. A further feature of no small importance is the location of the pumping means P between the filter and the heating coils of the regenerative heater A. During the normal operation of the pump, since the tanks R and M are disposed below the level of intake of the regenerative heater, the milk is drawn through the heating coils by a sucking action, that is, at a pressure below atmospheric pressure, whereby no milk will discharge from any leaks that might be in the coils H but the treated milk, flowing over the heating coils H will, if there be any exchange of liquid at all, enter through these leaks. The exchange of liquid, if such take place, will, therefore, always be from treated milk to untreated milk, but never from un-treated milk to treated milk to contaminate the latter.

The milk from the conduit 124 enters the bottom of the filter F, which is provided with a removable cloth filter 125 for removing any foreign material that might be in the milk, and passes upwardly and out through the conduit 126. During normal operation, the valve 127 wil be in the position shown by broken lines, thereby discharging the liquid from the conduit 126 into the conduit 128. From the conduit 128, the milk enters the bottom of the electro-purifier S, where it is subjected to an alternating current having a frequency of 60 cycles and being supplied at a potential of 220 volts. The particular frequency of the alternating current, as well as the voltage value, are purely a matter of choice and do not, as values, constitute parts of this invention, the system obviously being adapted to utilize an alternating current of any desired frequency or voltage value, or even direct current, so long as the liquid is subjected to the desired electrical treatment.

During the upward movement of the liquid through the pasteurizer, under normal automatic operation of the flow system, it is electrically heated to a predetermined temperature and is discharged from the upper portion of the treating chamber, through conduit 129, valve 130 and conduit 131, to the spreader head 131'. The spreader head distributes the liquid over the heating coils H where it heats the liquid traversing the coils H. After flowing over the heating coils H, the heated liquid passes over the cooling coils K, where it is chilled to a desired temperature.

To automatically electrically control the operation of the flow system, a thermo-electric device T is disposed at the upper portion of the electro-purifier or pasteurizer. The thermo-electric device T has a bulb 116 that is responsive to the temperature of the liquid in the upper portion of the pasteurizer. The thermo-electric device shown in Fig. 1 is of conventional design and need not be described in detail. There are, however, some special mechanical and electrical features associated with the pointer 114 of the thermo-electric device. The operation of these special features will be pointed out more in detail during the description of the electric control system for automatically controlling the flow system.

Figure 2:
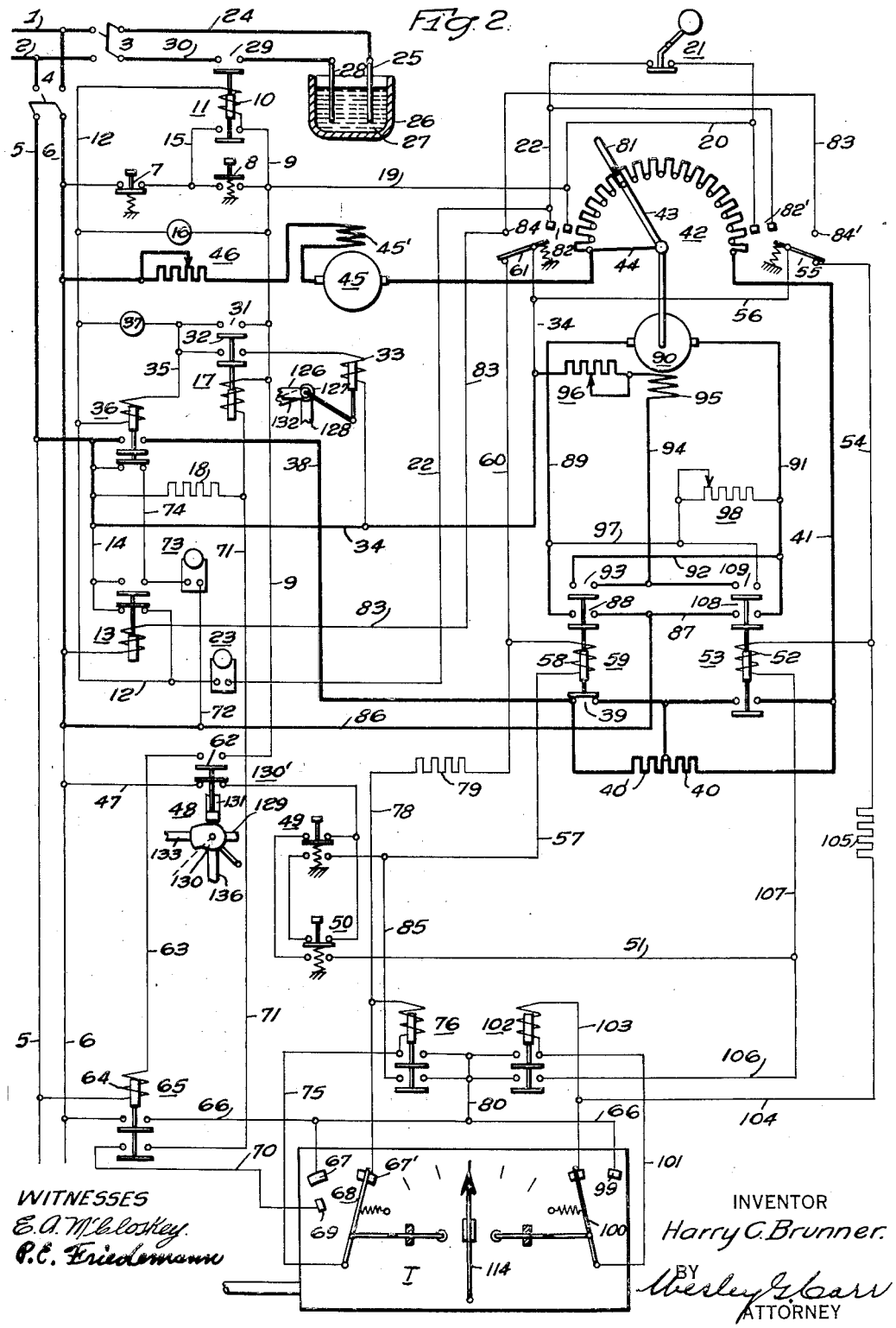

I do not wish to be limited to the particular thermo-electric device shown in Fig. 1 but feel that, for some types of liquids, an electrical control thermometer, such as is shown in Fig. 4, may be more desirable. In Fig. 4, 1 and 2 designate the supply conductors for supplying the alternating currents required for electrically treating the milk passing through the pasteurizer. The switch 3' connects the supply conductors 1 and 2 to the conductors 24' and 30' and, in consequence, to the electrical-control thermometer T, having the thermo-responsive device 116'.

It is also a very important feature for the proper treatment of milk that no air-bubbles shall be entrapped in the milk being transmitted to the pasteurizer S. To eliminate the air from the milk, the filter F is provided with a dome-shaped upper portion 140. The dome-shaped portion 140 is provided with a valve stem 144. A cap 146, having a valve seat and aperture 148, is disposed on the valve stem and is so arranged that a chamber 149 is formed intermediate the cap and the upper portion of the stem. The stem is provided with a longitudinal opening for the reception of a float-controlled valve rod 143. The valve rod 143 is provided with flat sides intermediate its ends which are of sufficient length to extend from the interior of the filter F to the chamber 149. A clear understanding of the structure of the valve rod may be had by reference to Figs. 5, 6 and 7.

Connected to the lower end of the valve rod 143 is a float 141, the float and valve rod being guided by the guide members 142. A pin 142', engaging the guide 142, prevents the float and valve rod 143 from dropping out of the stem 144. The upper portion of the valve rod is circular in section (see Fig. 7) so that the aperture 148 may be effectively closed when the float and valve rod are in their upper-most position. If air or some other gas be transmitted to the filter F, the air will rise to the upper portion of the filter and collect in the dome shaped portion 140, and, if the air, thus collected exceeds a predetermined amount, the float 141 will drop and open the valve, thus permitting the air to escape. Since the liquid in the filter is under pressure, the level thereof will immediately rise to that shown in Fig. 5 to again close the aperture 148. The discharge conduit 126, leading to the electrically controlled valve 127, is disposed in the dome shaped portion of the filter but is so disposed that the opening thereof is, at all times, below the level of the liquid in the filter, whereby no air is transmitted to the pasteurizer S.

A more complete understanding of the novel features of my invention may be had from a study of the sequence of operation of the electrical control system and the coaction of the electric control system to automatically control the operation of the flow system. Let it be assumed that there is no liquid in the flow system, and that the attendant wishes to start the operation of the pasteurizer. He so positions the three-way valve 121 that the circulating brine from the chamber R may pass from the conduit 120' to conduit 122 and he also so adjusts that valve 138 that any liquid flowing down the conduit 132 will be discharged into the supply tank R. The three-way valve 130 is also adjusted to the position shown in full lines in Fig. 1. The positioning of the three-way valve 130, as shown in Fig. 1, connects conduits 129 and 133 and closes conduit 131 so that liquid cannot get into it. If the system of conduits shown by 136 and 137 be used, the valve 130 is designed to be a four-way valve and, when in the position shown by full lines, will connect conduits 129 and 136 by an independent path, and conduits 131 and 133 by an independent path (see Fig. 8). Again it will be noted that, for the stated position of the valve 130, liquid from conduit 129 cannot back up into conduit 131.

For the preferred modification, the valve 130 is a three-way valve, as above specified. It is, of course, understood that the valve 130 may be so positioned that liquid from conduit 131 may syphon back through conduit 133 or if desired through conduit 136.

When valves 121, 138 and 130 have been manually operated to the positions above specified, the attendant closes switches 3 and 4 to energize the control busses 5 and 6 and the power busses 24 and 30. To start the operation of the entire system for electrically treating a liquid, more particularly, milk, the starting switch 8 is depressed, thereby establishing a circuit from the bus 6, through the stop switch 7, the starting switch 8, conductor 9, actuating coil 10 of the main contactor 11, conductor 12, the back contact members of the stopping relay 13 and conductor 14, to the other control bus 5. Upon the operation of the mainline contactor 11, a holding circuit is established for the line contactor through conductor 15 and the lower contact members of line contactor 11. At the same instant that the line contactor 11 is energized, the control relay 17 is also energized by a circuit extending from the energizing conductor 9, through the coils of the control relay 17 and the resistor 18, to the energized conductor 14. It will be noted that, the instant the energizing circuit is established for the coils of the main contactor 11, a circuit is also established for a signal device 16 which may be either a red light or a buzzer or any other appropriate means for indicating to the attendant that the system is energized.

If, during the starting operation, the attendant has overlooked the fact that there is no liquid, in either of the chambers R or M, the float 139 (see Fig. 1) will be in its lower-most position to close the switching means 21. In Fig. 2 the switching means are shown in such circuit-closing position, whereby a circuit is established from the energized conductor 9, through the conductors 19 and 20, the switching means 21, conductor 22, signalling means 23 and the lower or back contact members of the stopping relay 13, to the energized conductor 14. The signalling means 23, then usually indicates, by sound, to the attendant that liquid must first be put in the chambers R and M.

Immediately after the operation of the mainline contactor 11 to close its upper contact members, an alternating-current potential of a predetermined value and frequency is placed across the carbon electrodes 25 and 28 of the pasteurizer chamber S. If there be liquid in the pasteurizer, the circuit is completed, as may be readily apparent from an inspection of Fig. 2 of the drawings. During the starting operation, while the three-way valve 130 is in the position shown by full lines in Fig. 2, the actuating coil 64 of the control relay 65 cannot be energized, and the thermo-electric device T cannot automatically control the operation of the pump motor 45 and the rheostat motor 90, but the operation of these motors is manually controlled by the push-button switches 49 and 50.

Operation of the control relay 17, as above explained, establishes a circuit for the line contactor 36 which extends from the energized conductor 9, through the upper contact members 31, the conductor 35 and the actuating coil of the motor line contactor 36, to the energized conductor 12. A green light 37 is connected in parallel-circuit relation to the actuating coil of the line contactor 36, to indicate to the attendant that the line contactor 36 has operated and that the circuit for the pump motor has been established.

The above-discussed operation also causes energization of the actuating coil 33 for the electrically controlled valve 127. The circuit for coil 33 may be traced from the energized conductor 35, through the lower contact members 32 of the control relay 17, the coil 33 and conductor 34, to the energized conductor 14.

The circuit for the pump motor may be traced from the bus 5, through the upper or make contact member of the motor line contactor 36, conductor 38, the back or lowermost contact members 39 of directional contactor 59, resistor 40, conductor 41, a section of the motor-operated rheostat 42, the rheostat arm 43, conductor 44, the armature and series field 45, respectively, of the motor 45 and the manually operable rheostat 46, to the other bus 6.

The motor 45 will then proceed to operate the pump P at a speed depending upon the position of the rheostat arm 43, the adjustment of the manually operable rheostat 46 and the resistance value of the resistor 40. Obviously, the speed of the motor may drive the pump either too slow or too fast. If the motor operates at an excessive speed, the liquid that is being pumped from the supply tank R through the pasteurizer S will keep the bulb 116 at a temperature too low for automatic operation. The pointer 114 will indicate the temperature of the liquid passing through the sterilizer. The attendant then operates the one or the other of the manually operable push-button switches 49 or 50, thereby controlling the direction of rotation of the rheostat motor 90.

If, as above assumed, the motor 45 is operating at an excessive speed, the push-button switch 49 is depressed, thereby establishing a circuit from the bus 6, through conductor 47, the lower contact members of the valve-operated switch 130′ push-button switch 50, the lower contact members of the push-button switch 49, conductor 57, actuating coil 58 of the directional contactor 59, conductor 60, switch arm 61 and conductor 34, to the energized conductor 14. The instant directional contactor 59 operates to open the contact members 39, an additional resistor section 40′ is inserted in series with the circuit for the motor 45, and a circuit is also established for the rheostat motor 90 which causes the motor 90 to operate in such direction as to increase the resistance in series with the motor 45. It will be apparent, from the operation of the directional contactor 59 and the rheostat motor 90, that the voltage across the armature terminals of the motor 45 is first substantially instantaneously decreased and thereafter continues to be decreased gradually by the operation of motor 90. The beneficial functions of the directional contactors 53 and 59, in conjunction with the resistor sections 40 and 40′, will be pointed out more in detail during the discussion of the automatic operation of the flow system.

The circuit for the rheostat motor 90 may be traced from the bus 6, through conductors 86 and 87, contact members 88 of the directional contactor 59, conductor 89, the armature of the motor 90, conductors 91 and 92, contact members 93 of the directional contactor 59, conductor 94, series field windings 95, the manually adjustable rheostat 96 and conductors 34 and 14, to the bus 5. The rheostat motor 90 is a single-phase series commutator motor and, in order to provide the motor 90 with a speed characteristic similar to that of a direct-current shunt-wound motor, the adjustable rheostat 98 is connected in parallel-circuit relation to the armature of the motor 90. By a proper adjustment of the rheostat 98, the motor 90 may be given a flat speed characteristic so long as the load on the motor 90 remains substantially constant. Since the load of a rheostat is nearly constant, the motor 90 will have a flat speed characteristic. The necessity of supplying a motor-generator set with my system for electrically treating liquids to operate a direct-current rheostat motor is eliminated.

With the circuits established as above discussed, the rheostat arm 43, provided with a pointer visible to the attendant, is moved in a counter-clockwise direction. When the rheostat arm 43 has moved to a vertical position, assuming that it originally was at the right of the vertical position and not as shown, and the temperature of the liquid, as indicated by the pointer 114, is still below the normal discharge temperature of the liquid to be treated, then the attendant further adjusts the speed of the motor 45 by the manually operable rheostat 46, and, if necessary, by the operation of the one or the other of the push-button switches 49 or 50, as the case may be. It is to be understood that, during all of the starting period, none of the liquid passing through the pasteurizer S enters conduit 131 but all of it is discharged into the conduit 133, through the conduit 132 and the valve 138, to the brine-recirculating supply tank R.

When the temperature of the system has been brought up to normal, as indicated by the thermo-electric device T, the attendant moves the valve 130 to automatic-run position. The recirculating brine then discharges from the pasteurizer, through conduit 129, the valve 130, conduit 131 and, from the spreader head 131′, over the heating coils H. The brine is collected at B and returned to the supply tank R. Any liquid in conduits 133 and 136, since these conduits are connected at the valve 130, when the valve is in the run position, will drain back into the brine tank R.

Since the brine is made to flow through conduit 131 and spreader head 131′ and over the coils H, these elements are brought up to normal temperature, and the system beyond the pasteurizer will not be "seeded" with undesirable organisms, and no untreated liquid will pass out of the spreader head. In other words, if the elements, the conduit 131, the spreader head 131′, heating coils H, cooling coils K and receptacle B were not brought up to operating conditions and milk, even though it should have the desired high temperature, were discharged into conduit 129, it would be cooled too rapidly by the mentioned elements, and the high temperature, though initially at the desired value, would not be maintained long enough. The mentioned apparatus may thus become "seeded" with undesirable organisms and contaminate all the milk passing to the bottling machine, regardless of the proper operation of the control system.

When all the apparatus has been brought up to normal operating conditions, as indicated by the thermo-electric device T, the attendant operates the valve 121 to connect the milk-supply tank M to the conduit 122, and milk begins to circulate through the system. The pasteurizer S is usually provided with a glass window at its upper portion and, when milk begins to show at the glass window, or when it begins to discharge at the spreader head, the valve 138 is thrown to such position that the milk will circulate to the supply tank M when the pump P stops, as will be explained hereinafter.

To assure that only properly treated milk shall be discharged from the spreader head 131', the speed of operation of the pump P must obviously be controlled by an apparatus responsive to the amount of treatment given to the milk or liquid in the pasteurizer. This suggested desirable control is accomplished by the electrical device designated generally by the reference character T. It will be noted that the manual operation of the valve 130 interrupts the circuit for the manual control of the direction of operation of the rheostat motor 90 by disconnecting the push-button switches 49 and 50, from the bus 6 and establishing a circuit for the control relay 65. The circuit for this relay may be traced from the energized conductor 9, through the contact members 62 of the valve-operated switch mechanism 130', conductor 63 and actuating coil 64 of the control relay 65, to the bus 5.

If, during the normal operation for some reasons, the temperature of the liquid in the upper portion of the pasteurizer S drops below a predetermined desired minimum, the pointer 114 (see Fig. 2) will move in a counter-clockwise direction to actuate the spring-biased lever 68 in a counter-clockwise direction to engage the segment 67, thereby establishing a circuit from the bus 6, through the upper contact members of the control relay 65, conductor 66, segment 67, contact lever 68, conductor 75, the actuating coil of the directional control relay 76, conductor 78, resistor 79, conductor 60, contact lever 61 and conductors 34 and 14, to the bus 5. Operation of the directional control relay 76 establishes a circuit for the directional contactor 59. This circuit may be traced from the bus 6, through the conductors 66 and 80, the lower contact members of the relay 76, conductors 85 and 57, the actuating coil 58 of the directional contactor 59, conductor 60, contact lever 61 and conductors 34 and 14, to the bus 5. The operation of the directional contactor 59 initiates an operation of the motor 90 in every particular similar to the operation of the motor 90, heretofore given in connection with the manual control of motor 90, through the operation of the push-button switch 49.

To prevent any under-treated milk from discharging from the pasteurizer S, it is desirable that an immediate-speed correction be made of the motor 45. This is accomplished by the insertion of the resistor 40' in series with the motor 45. It is thus obvious that the voltage across the motor terminals is decreased substantially instantaneously and is then further gradually decreased by the movement of the controller arm 43 in a counter-clockwise direction. The insertion of the resistor 40' in the motor circuit of the motor 45 thus effects a speed correction for the motor 45 which is somewhat in advance of the temperatures that would exist in the pasteurizer S if reliance were placed on the operation of the rheostat arm 43 alone.

Let it be assumed that the temperature of the liquid in the upper portion of the chamber S is within the desired range. Then a change of the temperature of the liquid entering the pasteurizer will cause a change in temperature at the upper portion of the chamber S when the liquid reaches that portion. Unless the pump speed be changed for this temperature change, untreated or under-treated or over-treated milk will pass from the chamber S, i. e., the speed of the pump will be either too slow or too fast.

If a motor-operated rheostat alone be used, and the rheostat motor be started, to operate when a predetermined minimum temperature has been reached, it is obvious that appreciable time will elapse before the desired speed correction will have been made. In the meantime, the temperature of the liquid in the pasteurizer will continue to decrease. To eliminate this undesirable result, the resistors 40 and 40' are associated with the directional contactors 53 and 59. When, as above explained, the temperature is at a predetermined minimum value, an immediate speed correction for the motor 45 is made by the insertion of the resistor 40' in series with the motor and also a gradual speed correction is made by the operation of the motor-operated rheostat arm 43. From the foregoing discussion, it will thus be apparent that the voltage impressed on the motor 45 for selected operating conditions of the pasteurizing system is proportional to the electrical characteristics of the liquid in the pasteurizer S and also a function of the rate of change of such electrical characteristics.

From the operations above discussed, it will be apparent that the speed of the pump P drops, the temperature of the liquid in the pasteurizer immediately rises to some higher value, and, in consequence, the pointer 114 moves in a clockwise direction, and the spring-biased arm 68 is disengaged from segment 67. Since the operation of the directional-control relay 76 established a holding circuit for that relay, nothing takes place when the contact lever 68 is disengaged from segment 67. As the temperature continues to rise, the pointer 114 moves in the clockwise direction, and the contact lever 68 soon engages the segment 67', thereby shunting the coil of relay 76. When the coil of the relay 76 is deenergized, the actuating coil 58 of directional contactor 59 is deenergized, and the motor 90 stops operation. If, by the operation just discussed, the speed correction for the motor 45 is not sufficient, the temperature in the pasteurizer will again decrease to a predetermined minimum desirable temperature, and the cycle of operation for correcting the speed of the motor 45 will be repeated. But, at each recurrence of the cycle, the motor 90 will be caused to operate for a shorter interval of time. Eventually, the rheostat arm 43 will be positioned at the point desired, and the speed of the motor 45 will thus remain constant. The combined use of the resistor sections 40 and 40' and the motor-operated rheostat 42 thus completely prevents any hunting of the motor 45.

If, for any reason, in spite of the control apparatus just discussed, the temperature in the pasteurizer drops below a predetermined desirable minimum, the contact arm 68 will continue to move in a counter-clockwise direction, under the influence of the pointer 114, until the arm 68 bridges the contact segments 67 and 69, thereby establishing a low-resistance shunt circuit for the actuating coil of the control relay 17. This circuit may be traced from the bus 6, through the upper contact member of the control relay 65, the conductor 66, contact segments 67 and 69 bridged by the contact lever 68, conductor 70, the lower contact members of the control relay 65 and conductor 71, to the junction at the right of the resistor 18. The actuating coil of the control relay 17 is thus deenergized, thereby causing the stopping of the pump motor. It will be noted that deenergization of the control relay 17 causes the contact members 32 to move to open-circuit position, thus deenergizing the coils 33. The valve 127 thus moves to the position shown in full lines in Fig. 1, the position it will always take when motor 45 is not operating. When the valve 127 is in the position shown in Fig. 1, the conduit 132 is connected to the conduits 126 and 128, and the liquid in the conduits 131, 129 and in the chamber of the pasteurizer drains back into the supply tank M. In actual operation, the valve 127 should be located somewhat below the upper ends of the electrodes 25 and 28 so that the liquid will be drained out of the pasteurizer S to some extent. None of the liquid from the pasteurizer S will thus pass out at the conduit 129 in an untreated condition when the pump motor 45 again starts to operate.

During normal operation, the character, as well as the temperature, of the milk entering the lower portion of the pasteurizer S may change considerably, and, as a result of such variations, the rheostat arm 43 is moved successively to provide the necessary speed correction for the motor 45. After some time, because of such variations or because of an improper adjustment of the manually operable rheostat 46, the rheostat arm 43 approaches its limits of travel. When near the limits of its travel, a circuit is established for the signal device 23, such as a bell. This circuit may be traced from the energized conductor 9, through conductor 19, contact segments 82 or 82', depending upon which limit of travel the rheostat arm 43 has approached, conductor 22, signalling bell 23, the lower contact members of the stopping relay 13 and the conductor 14, to the bus 5.

If the attendant does not heed the warning of the signal bell 23 and make a proper adjustment of the manually operable rheostat 46 to continue automatic operation, the rheostat arm 43 will continue to move towards one of its limits of travel and, eventually, will actuate either spring-biased contact lever 55 or spring-biased contact lever 61 to interrupt the circuit for the actuated directional contactor of the motor 90, thus completing a circuit for the stopping relay 13. The circuit for the stopping relay 13 may be traced from the bus 6, through the actuating coil of the stopping relay 13, conductor 83, contact fingers 84 or 84', one of the contact levers 61 or 55 and the conductors 34 and 14, to the bus 5. The instant the stopping relay 13 operates, a circuit is established for the signalling bell 73, through the circuit extending from the energized conductor 14, the upper contact members of stopping relay 13, the signal device 73 and conductors 72 and 86, to the bus 6. The movement of the lower contact members of the stopping relay 13 to an open-circuit position interrupts the circuit for the actuating coils of the main-line contactor 11, the control relay 17, and the motor line contactor 36, respectively, thereby stopping the operation of the entire system for electrically treating liquids.

To provide an additional speed correction for the motor 45, the scheme of control shown in Fig. 4 may be used in addition to the thermo-electric device T. In the scheme shown in Fig. 4, the electrical characteristics, particularly the resistance value of the liquid, is used to control the speed of the motor 45. A pair of electrodes 153 are mounted in the lower portion of the pasteurizer S and are connected, either in parallel or in series-circuit relation, to the motor-operated rheostat. If the electrodes 153 are connected in parallel-circuit relation to the rheostat 42, the range of the rheostat is varied as a function of the change of the electrical characteristics of the liquid being treated.

For the proper functioning of the additional speed-control device, the electrodes need not necessarily be located in the lower portion of the chamber S but may be located in the conduit 128, as shown in Fig. 3. Possibly, in practice, the electrodes 153 will be located in a separate chamber, somewhat similar in structure to the pasteurizing chamber S, connected in the conduit 128 leading from the filter F to the pasteurizer S. When thus connected, no air bubbles will impair the operation of the electrodes 153. Furthermore, the electrodes will not only respond to the change in electrical characteristics of the liquid being treated but will also respond to the temperature of the liquid passing to the pasteurizer. Obviously, if the temperature of the liquid being supplied to the chamber S drops, a speed correction should be made for the pump P before such change is reflected at the thermo-electric device T. If the temperature of the liquid entering the chamber S drops, the resistance value in series with the motor 45 is increased and, in consequence, the speed of the motor drops. Obviously, this desirable effect may be accomplished, regardless of whether the electrodes 153 are connected in series-circuit relation or in parallel-circuit relation to the rheostat 42. The electrical characteristics of the rheostat 46 and 42 will, necessarily, have to be differently adjusted for the different circuit connections.

When the electrodes 153 are employed, the desirability of using the anti-hunt resistors 40 and 40' is not so apparent because the electrodes will make a speed correction for the motor 45 and do so before any disturbing effect appears at the temperature-responsive device T located in the upper portion of the chamber S. When a change of temperature occurs in conduit 128 and also when the electrical characteristics of the liquid change, the speed of the motor, and, in consequence, the pump, will increase or decrease, as the case may be, thus preventing improperly treated liquid from passing from the chamber S.

In order to selectively connect the electrodes in circuit with the electrical control system or to disconnect the electrodes, the manually operable switch 190 is used (see Fig. 4). When the switch 190 is in the position shown, the electrodes are not connected in circuit with the electrical control system. The circuit arrangement will then be as shown in Fig. 2. When the switch 190 is moved counter-clockwise, a circuit is established from the energized conductor 41, through a section of the rheostat 42, the rheostat arm 43, conductors 44 and 44', contact segments 155 and 156 bridged by the left-hand switch arm and a circuit in parallel with this circuit is established from conductor 41, through contact segments 150 and 151 bridged by the right-hand switch arm-conductor 152, electrodes 153 and conductor 154, to the segment 155. By a clockwise movement of switch 190, the electrodes 153 may be connected in series-circuit relation to the rheostat 42 and the motor 45.

The pump P is of the positive-acting type and, in order to provide an additional and independent adjustment of the speed of the liquid passing through the system, the recirculating conduit 134 and micrometer valve 135 are provided. Such additional speed adjustment is desirable when the liquids being treated differ widely in electrical characteristics, as will be the case when not only milks of different types are treated, but when the flow system is being used to electrically treat different fruit juices. The micrometer valve 135 may be adjusted for a given liquid speed and, to maintain such speed, some of the liquid recirculates through the pump P.

The modification shown in Fig. 3 is, in many respects, similar to the modification shown in Fig. 2. It has the advantage, however, of being somewhat more simple and, in consequence, somewhat cheaper. In the modification shown in Fig. 3, the valve 130 and the switching means 48' are not brought into cooperative relation.

The switching means 48', in addition to the switch for controlling the starting operation, includes switching means for connecting the signalling means 111 in circuit relation to the electrical control system. When the switch 48' is in the start position, (the position shown) a circuit is established from the conductor 2, through switch 3, conductors 30 and 113, contact members 112, signalling device 111, conductors 86 and 110, bus 6 and switch 4, to conductor 1. The circuit for the signalling device is carried to the electrode side of the switch 3 so that during cleaning and flushing of the system, the electrical control system for the motor 45 and associated elements may be operated without operating the signal bell 111.

The modification shown in Fig. 3 also shows the electrodes 153 disposed in the conduit 128.

A study of the detailed showing of the four-way valve 130 (see Fig. 8) will make it clear that, when the valve is in the position shown, no liquid being discharged from the pasteurizer can flow into conduits 133 and 136, and any liquid in these conduits can readily drain back into the supply tanks R or M, depending upon the position of the respective valves 137 and 138. When the valve vane is moved through 90°, conduit 129 is connected to conduit 136, and conduit 131 is connected to conduit 133 and, in consequence, no liquid discharging from the conduit 129 can get into conduit 131 to contaminate even a portion of the contents of this conduit. It will, of course, be apparent that the conduits 129, 131, 133 and 136 are connected to the couplings 129', 131', 133' and 136', respectively.

When a three-way valve is used, the valve vane 130" will necessarily be different in structure, the structure, however, being such that conduit 131 may be closed when conduits 129 and 133 are connected, thus preventing entry of liquid into conduit 131 during the starting operation.

I do not wish to be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

Having thus described my invention, what I claim and desire to secure by Letters Patent is:

1. A system for electrically treating a liquid comprising a longitudinal open-end container, a pair of electrodes constituting a pair of oppositely disposed walls of the container, means for transmitting an electric current from the one to the other electrode through the liquid interposed therebetween, means for causing the liquid being treated to move longitudinally of said container and between said electrodes, and electric control means for controlling the speed of movement of the liquid through said container at a rate inversely proportional to the difference in temperature between the liquid entering the container and the liquid leaving it.

2. A system for electrically treating a liquid comprising a longitudinal open-end container, a pair of electrodes constituting a pair of oppositely disposed walls of the container, pumping means for causing the liquid being treated to move longitudinally of said container and between said electrodes, means for transmitting an electric current from one electrode to the other through the liquid interposed therebetween, thermo-electric means in said container, and an electric control system associated with said thermo-electro means for controlling the speed of said pumping means to discharge the treated liquid from said container at a substantially constant temperature.

3. In a system for electrically treating a liquid, including a purifier having a pair of spaced electrodes, a current-supply circuit therefor, a conduit for supplying liquid to the purifier to pass between the electrodes, a conduit for discharge of liquid therefrom, a receptacle for the liquid to be treated and a receptacle for a different liquid having approximately the same electrical conductivity as the liquid to be treated, electrically controlled apparatus for causing the liquid to pass to the conduits and between the electrodes, automatic means for supplying either the one or the other of said liquids to said electrically controlled apparatus at a pressure substantially constant but below atmospheric pressure, the said conduit leading to the purifier having a portion thereof in the form of a coil, and the discharge conduit being disposed to discharge the treated liquid over said coil, and electrical means for automatically controlling the speed of operation of said electrically controlled means in response to changes of the electrical characteristics of the liquid being treated.

4. A system for electrically treating a liquid comprising a purifier having a pair of spaced oppositely disposed electrodes, an electric-current supply circuit therefor, a conduit for supplying liquid to the purifier to pass between the electrodes, a conduit for discharge of liquid therefrom, a receptacle for the liquid to be treated, a receptacle for liquid having approximately the same electrical conductivity as the liquid to be treated, a valve in the discharge conduit of the purifier for discharging said liquids to their respective receptacles, electrically controlled apparatus for causing either the one or the other of said liquids to pass through the conduits between the electrodes, electrical control means controlled by the position of said valve for controlling the operation of said apparatus, and electrical means, responsive to the electrical characteristics of the liquid being treated, for automatically controlling the speed of operation of said apparatus.

5. In a system for electrically treating a liquid, including a filter, an electro-purifier having a pair of spaced oppositely disposed electrodes, an electric-current supply circuit therefor, a receptacle for liquid to be treated, a receptacle for liquid having approximately the same electrical conductivity as the liquid to be treated, conduits leading from said receptacles to the filter, a valve for selecting the liquid to be passed through the filter, a conduit intermediate the filter and the electro-purifier, an electrically controlled valve in said conduit for recirculating either of said liquids, a conduit for discharge of liquid from the electro-purifier, a valve in the discharge conduit, means for circulating either of said liquids through the system, and electrical means controlled by the position of the last named valve for selectively subjecting the system to manual or automatic control.

6. In a system for electrically treating a liquid, including a pasteurizer having a pair of spaced oppositely disposed electrodes, an electric-current supply circuit therefor, a conduit for supplying liquid to the pasteurizer to pass between the electrodes, a conduit for the discharge of liquid therefrom, a receptacle for the liquid to be treated, a receptacle for liquid having approximately the same electrical conductivity as the liquid to be treated, electrically controlled apparatus for causing fluid to pass through the conduits between the electrodes, means controllable at will for supplying the liquid to be treated or the liquid of the same electrical conductivity to the electrically controlled apparatus, means responsive to changes in the electrical characteristics of the liquid passing through the pasteurizer for controlling the speed of operation of said apparatus, and means, responsive to selected predetermined temperatures of the liquid passing through the pasteurizer, for causing cessation of operation of said apparatus.

7. In a system for electrically treating a liquid, including a pasteurizer having a pair of spaced oppositely disposed electrodes, an electric-current supply circuit therefor, a receptacle for the liquid to be treated, pumping means for transmitting the liquid from the receptacle to the pasteurizer, a conduit disposed in the form of a coil leading from the receptacle to the pumping means, whereby the liquid is drawn from the receptacle to the pumping means by a sucking action, a conduit leading from the pumping means to the pasteurizer, a discharge conduit for discharging the treated liquid from the pasteurizer over the said coil, electrical means, responsive to the electrical characteristics of the liquid being treated, for controlling the speed of the pumping means, and electrical means, responsive to selected predetermined electrical characteristics of the liquid being treated, for causing cessation of operation of said pumping means.

8. In a system for electrically treating a liquid, including a pasteurizer having a pair of spaced oppositely disposed electrodes, an electric-current supply therefor, a pair of receptacles, one of said receptacles containing a liquid having approximately the electrical characteristics of the liquid to be treated and the other receptacle containing the liquid to be treated, pumping means, means for driving said pumping means, manually operable means for selectively connecting the pumping means to said receptacles, a conduit extending from said selecting means to the pumping means, said conduit being formed into a coil for a portion of its length, a conduit extending from the pumping means to the pasteurizer, thermo-electric means in the pasteurizer for controlling the speed of operation of the means for driving the pumping means, electrical control means, responsive to the operation of the thermo-electric means, for stopping the pump-driving means and disconnecting the electrodes from the electric-current supply, a discharge conduit for the pasteurizer for discharging the liquid over said coil, a valve in the discharge conduit for causing recirculating of the liquid when desired, and switching means operated by the valve in the discharge conduit for effecting automatic operation of the system.

9. In a system for electrically treating a liquid, including a supply receptacle for the liquid to be treated, means for maintaining the liquid head in the receptacle substantially constant, a filter, a pasteurizer, and a regenerative heater having coils, pumping means disposed intermediate the receptacle and the filter for circulating the liquid from the receptacle through the coils of the heater, the pumping means, the filter and the pasteurizer and over the coils of the heater, an electric motor for driving the pumping means, an electric-current supply for the motor and the electric pasteurizer, thermo-electric means, responsive to the temperature of the liquid adjacent to the outlet of the pasteurizer, for controlling the speed of operation of the motor through a system of control comprising a rheostat in series with the pump motor, a rheostat motor for varying the resistance value of the rheostat, a pair of resistors for connection in series with the pump motor, means, responsive to a predetermined operation of the thermo-electric means, for shunting one of the resistors, means, responsive to a different predetermined operation of the thermo-electric means, for inserting the other of said resistors in series with the pump motor, means, responsive to the first named predetermined operation of the thermo-electric means, for causing operation of the rheostat motor in one direction and means, responsive to the second named predetermined operation of the thermo-electric means, for causing operation of the rheostat motor in the other direction.

10. In a system for electrically treating a liquid, including a supply receptacle for the liquid to be treated, means for maintaining the liquid head in the supply receptacle substantially constant, a filter, a pasteurizer, and a regenerative heater having coils, pumping means disposed intermediate the receptacle and the filter for circulating the liquid from the receptacle through the coils of the heater, the pumping means, the filter and the pasteurizer and over the coils of the heater, an electric pump motor for driving the pumping means, an electric-current supply for the motor and the electric pasteurizer, thermo-electric means, responsive to the temperature of the liquid in the pasteurizer, for controlling the speed of operation of the pump motor through a system of control comprising electric means for gradually increasing the voltage across the armature terminals of the pump motor in response to a predetermined operation of the thermo-electric means, electrical means for substantially instantaneously increasing the voltage across the armature terminals of the pump motor in response to the same predetermined operation of the thermo-electric means, electrical means for gradually decreasing the voltage across the armature terminals of the pump motor in response to a different predetermined operation of the thermo-electric means, electrical means for substantially instantaneously decreasing the voltage across the armature terminals of the pump motor in response to the last named predetermined operation of the thermo-electric means.

11. A system of the class described for automatically and electrically treating liquids, a supply tank for the liquid to be treated, a pasteurizer, a regenerative heater, a spreader head for discharging treated liquid over the coils of the regenerative heater, a discharge conduit for the pasteurizer, a plurality of conduits, a valve connected to said conduits to the discharge conduit for selectively discharging liquid from the pasteurizer into selected conduits and positively preventing the entry of liquid into the conduits not selected, pumping means for causing the liquid to circulate from the supply tank through the pasteurizer, and means energized by a cessation of operation of the pumping means, for partially draining the pasteurizer.

12. In a system of the class described for automatically electrically treating liquids, a pasteurizer, a pair of oppositely disposed electrodes in the pasteurizer, pumping means for causing a flow of liquid through the pasteurizer, an electric motor for driving the pumping means, a source of electric current for the motor and the electrodes, means, responsive to selected predetermined temperatures of the liquid in the pasteurizer, for causing a stopping of the motor, and means, energized by the operation of the motor-stopping means, for causing the liquid in the pasteurizer to be drained out to a level somewhat below the upper end of the electrodes.

13. A system for electrically treating a liquid comprising a supply tank for the liquid to be treated, a regenerative heater having coils and conduits for connection to the supply tank, a filter, pumping means connected intermediate the coils of the heater and the filter, an electric pasteurizer having electrodes, an electric-current supply for the electrodes, means for cooling the electrodes, said filter being provided with a needle valve in the upper portion thereof, a float for operating the valve to open it when the air collecting in the upper portion of the filter exceeds a predetermined amount, whereby the liquid level in the upper portion of the filter is prevented from sinking below a fixed level, a conduit connected to the filter below the liquid level in the filter to prevent the withdrawal of any gas or air that may be in the upper portion of the filter and connected to the bottom of the pasteurizer, an electrically controlled valve in the conduit leading from the filter to the sterilizer for selectively causing the liquid from the filter to be discharged either into the supply tank or into the pasteurizer, a conduit connected to the top of the pasteurizer, a manually operable valve for selectively causing the liquid from the sterilizer to be discharged into the supply tank or over the coils of the regenerative heater, electrical means, responsive to the changes in the electrical characteristics of the liquid, for automatically controlling the operation of the system, and switching means operable by the manually controlled valve for selectively connecting the system either for manual control or automatic control.

14. In a system of the class described for electrically treating liquids, in combination, a pump for circulating the liquid through the system, an electric motor for driving the pump, a resistor for controlling the speed of the motor, an alternating-current series motor for controlling the resistance value of the resistor, a variable resistor in parallel with the armature of the alternating-current motor, whereby the motor may be made to simulate the characteristics of a shunt-wound direct-current motor, a pasteurizer, and thermo-electric means, responsive to the temperature of the liquid in the pasteurizer, for controlling the direction of rotation of the alternating-current motor.

15. A system for electrically treating a liquid comprising a supply tank for the liquid to be treated, a regenerative heater having coils and conduits for connection to the supply tank, a filter, pumping means connected intermediate the coils of the heater and the filter, an electric pasteurizer having electrodes, an electric-current supply for the electrodes, means for cooling the electrodes, said filter having a dome-shaped upper portion, a float-operated valve in the dome-shaped portion, the coaction of the float and valve being such that the valve opens to permit the escape of gas or air when the float sinks below a predetermined level, a conduit connected to the filter below the liquid level determined by the float, an electrically controlled valve for selectively causing the liquid from the filter to discharge either into the supply tank or into the pasteurizer, and thermo-electric means in the pasteurizer for controlling the operation of the electrically controlled valve.

16. In a system of the class described for electrically treating liquids, in combination, pumping means for causing a flow of the liquid through the system, and means responsive to the amount of treatment given to the liquid and means responsive to the electrical characteristics of the untreated liquid for jointly and automatically controlling the speed of the pumping means.

17. In a system of the class described for electrically treating liquids, a treating chamber, pumping means for causing a flow of liquid through the chamber, and means responsive to the temperature of the liquid immediately after being treated, and means responsive to the electrical characteristics of the liquid just before being treated for jointly and automatically controlling the speed of the pumping means.

HARRY C. BRUNNER.